Feb. 28, 1950 E. W. CHRISTEN 2,498,648
FISHLINE REEL POLE MOUNTING
Filed Feb. 16, 1946
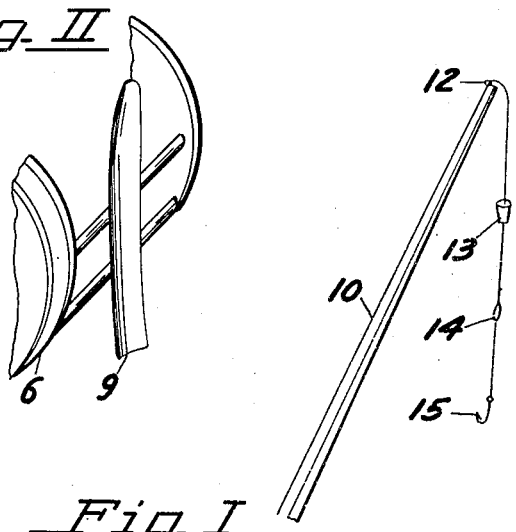
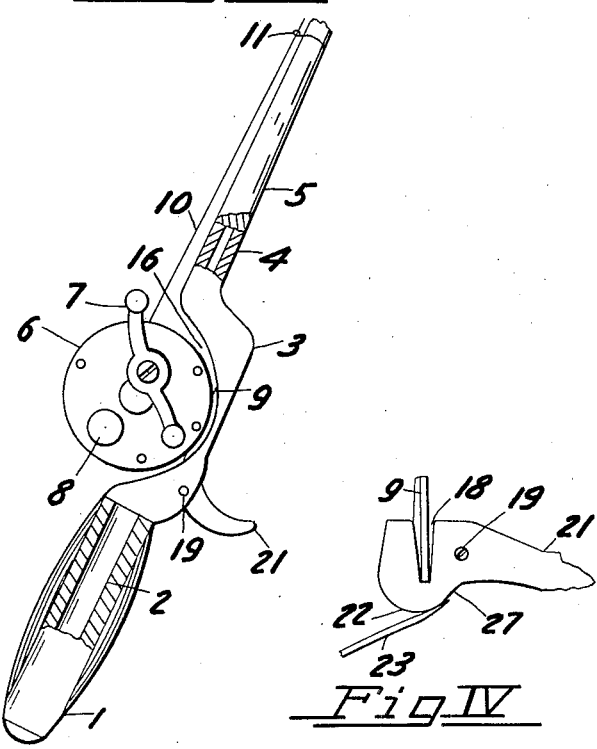
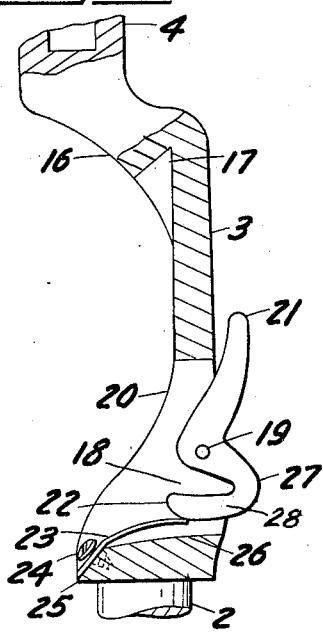
Earl W. Christen
Inventor
By
Attorney Patented Feb. 28, 1950

2,498,648

UNITED STATES PATENT OFFICE 2,498,648

FISHLINE REEL POLE MOUNTING

Earl W. Christen, Toledo, Ohio

Application February 16, 1946, Serial No. 648,134

1 Claim. (Cl. 43—22)

This invention relates to a reel mount or support in a fishing rod assembly.

This invention is an improvement in a fishing rod or pole reel seat adjacent the grip or handle for readily and positively assembling therewith a line reel of the type having a fish pole abutting base plate.

Referring to the drawings:

Fig. I is a side elevation, with parts broken away, of an embodiment of the invention;

Fig. II is a fragmentary detail view, in perspective, of a reel strip or base plate cooperating with the mounting or attaching means of the invention;

Fig. III is a side view, with parts broken away, showing the trigger in fully released position, being the position therefor when a reel is removed from the fishing pole, or when the device is in readiness to have the pole loaded with a reel; and Fig. IV is a fragmentary detail view of the trigger of Fig. III in reel strip engaging position, diagrammatic of the position thereof in Fig. I.

A grip 1 is mounted upon a stem 2 of an accessory frame 3. Stem 2 is aligned with and parallel to a hollow stem 4 at the opposite or upper end of frame 3 for engagement with a fish line pole 5. A fish line carrying reel 6 with a crank 7 and brake control 8 has fixed therewith, medially of the length of the reel, a rigid strip or thin reel plate 9.

Frame 3, with its end portions 2, 4, may be adapted to coact with a wide range of grips and poles. An advantage of frame 3 is that end portions 2, 4, are offset from an open, intermediate portion 16 when the reel 6 is mounted on the frame 3. Its line 10 leading off from the reel 6 extends close to and in approximate parallelism with the pole 5 in its course through guides 11, 12, out along the pole 5, as the line extends therebeyond to a float 13, a sinker 14 and to a hook 15.

The line pole frame or unit has an open side 16. An end of strip 9 is thrust into a pocket or seat 17. This locates the other end of the strip 9 at the mouth or notch 18 in the short arm of a trigger-like member 28 having a pivotal mounting 19 at an opening 20 thru the frame 3. The trigger-like member may be pivoted so that the notch 18 engages an end of reel plate or strip 9. Remote from the notch or seat 18 and on the opposite side of the pivot mounting 19, there is a finger bar or seat 21 as the major length arm of this lever device. The remote end of this lever, beyond the notch 18, has an arcuate face 22 riding against which is a leaf spring 23 having a mounting screw 24 as an anchor therefor at an upwardly inclined face 25 of frame 3. It follows that from this mounting, the leaf spring 23, which is normally flexed away from surface 26 at the bottom of the opening 20, and toward the arc face 22 of the trigger, provides frictional resistance to hold the trigger snugly, in its disconnected position, with the finger seat portion 21 up adjacent the underside of the frame 3. When the portion 21 of the trigger is swung outwardly, pivoting the trigger about mounting 19, the mouth or notch portion 18 seats about the end of base plate 9. Mouth or notch portion 18 thus provides a recess in the trigger for one end of base plate 9. This locates the finger seat 21 in normal use position, and simultaneously, the reel 6 is locked in its assembly with the pole unit with leaf spring 22 bearing against the curved portion 27 of the trigger-like member to hold the reel in the locked position.

What is claimed and it is desired to secure by Letters Patent is:

In a fishpole having a grip and a pole section: an intermediate frame portion offset from the axial line between the pole section and the grip to provide an open side having a pocket at one end and an opening at the other end, said pocket being rigid with the frame portion, a member pivotally mounted in said opening and providing a movable recess, said member being movable to and from a position for locking engagement with one end of a base plate of a reel when the other end of the base plate is engaged in said pocket, and a leaf spring mounted wholly within said opening and fixed at one end to the frame portion and bearing against said pivotally mounted member, and being adapted to ride against said pivotally mounted member, permitting said pivotally mounted member to be shifted to and from said locking position, said pivotally mounted member having a surface portion engageable by the free end of said leaf spring to maintain said member away from said locking position.

EARL W. CHRISTEN.

REFERENCES CITED

The following references are of record in the file of this patent:

UNITED STATES PATENTS

| Number | Name | Date |
|---|---|---|
| 1,494,552 | Kawell | May 20, 1924 |
| 1,591,122 | Gephart | July 6, 1926 |
| 1,923,035 | Hoerle et al. | Aug. 15, 1933 |
| 2,422,084 | Dorner | June 10, 1947 |